(12) United States Patent
Zemmouri

(10) Patent No.: US 11,035,614 B2
(45) Date of Patent: *Jun. 15, 2021

(54) DEVICE FOR PRODUCING A STREAM OF AIR THROUGH A VOLUME OF LIQUID

(71) Applicant: STARKLAB, Nomain (FR)

(72) Inventor: Jaouad Zemmouri, Nomain (FR)

(73) Assignee: STARKLAB, Nomain (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/102,799

(22) PCT Filed: Dec. 9, 2014

(86) PCT No.: PCT/FR2014/053225
§ 371 (c)(1),
(2) Date: Jun. 8, 2016

(87) PCT Pub. No.: WO2015/086979
PCT Pub. Date: Jun. 18, 2015

(65) Prior Publication Data
US 2017/0010044 A1 Jan. 12, 2017

(30) Foreign Application Priority Data

Dec. 11, 2013 (FR) ...................................... 1362386
Oct. 22, 2014 (FR) ...................................... 1460141

(51) Int. Cl.
| | |
|---|---|
| F28C 3/06 | (2006.01) |
| F28F 9/22 | (2006.01) |
| F24F 5/00 | (2006.01) |
| F24F 12/00 | (2006.01) |
| F28D 5/00 | (2006.01) |
| A01G 9/24 | (2006.01) |
| F28F 27/00 | (2006.01) |
| F24F 6/00 | (2006.01) |

(52) U.S. Cl.
CPC ............... *F28C 3/06* (2013.01); *A01G 9/246* (2013.01); *F24F 5/0035* (2013.01);
(Continued)

(58) Field of Classification Search
CPC ....... F28C 3/06; F28C 3/08; F24F 3/14; F24F 3/1417; F24F 12/003; F24F 5/00;
(Continued)

(56) References Cited

U.S. PATENT DOCUMENTS 1,503,428 A * 7/1924 Morterud .................. F28C 3/08
165/104.34
2,138,153 A * 11/1938 Grisdale .............. B01D 47/021
422/217
(Continued)

FOREIGN PATENT DOCUMENTS

CA 2289336 A1 * 5/2000 ............ F24F 5/0035
DE 2602008 A1 * 7/1976 ............. B01D 3/346
(Continued)

OTHER PUBLICATIONS

Compressor Thermodynamics by Tom Benson (NASA)—Retrieved Aug. 2017.*
(Continued)

*Primary Examiner* — Len Tran
*Assistant Examiner* — Jenna M Hopkins
(74) *Attorney, Agent, or Firm* — Blue Filament Law PLLC

(57) ABSTRACT

The invention relates to a device (1) for producing a stream of air (F'), wherein said device comprises an enclosure (10), which is intended for containing a volume of liquid (V), and which comprises at least one air-discharge opening (101), air-injection means (12) which make it possible to create and pass an incoming stream of air (F) from the outside of the enclosure into a volume of liquid (V) contained in the enclosure, by injecting said incoming stream of air (F) into said volume of liquid (V) underneath the surface of said volume of liquid (V), such that an outgoing stream of air (F'), treated by direct contact with the volume of liquid, is
(Continued)

discharged from said enclosure by passing through the air-discharge opening (101) of the enclosure. The enclosure comprises one or more baffles (14; 14'; 14") which are positioned between the volume of liquid (V) and said discharge opening (101), and which make it possible to circulate the stream of air (F') exiting the volume of liquid until the discharge opening (101), causing same to undergo one or more changes of direction such as to prevent the spraying of liquid through the air-discharge opening (101).

20 Claims, 5 Drawing Sheets

(52) U.S. Cl.
CPC .............. *F24F 12/006* (2013.01); *F28D 5/00* (2013.01); *F28F 9/22* (2013.01); *F28F 27/00* (2013.01); *F24F 2006/008* (2013.01); *F28F 2009/226* (2013.01); *Y02B 30/56* (2013.01)

(58) Field of Classification Search
CPC ...... F24F 2006/008; F24F 12/006; F24F 3/16; F24F 6/18; F24F 1/0071; F24F 1/0007; F24F 1/0073; F24F 1/0076; F24F 1/0328; F24F 1/035; F24F 1/0353; F24F 1/02; F24F 3/02; F24F 3/04; F24F 3/06; F24F 3/065; F24F 3/08; F24F 3/10; F28F 2009/222; F28F 27/00; F28D 5/00; F28D 19/006; B01D 47/02; B01D 47/021
USPC ........................................................ 165/110
See application file for complete search history.

(56) References Cited

U.S. PATENT DOCUMENTS

| | | | | |
|---|---|---|---|---|
| 2,209,775 A * | 7/1940 | Karlsteen | ................ | F24F 3/16 422/4 |
| 2,374,208 A * | 4/1945 | Jones, Jr. | ................ | F24F 3/14 165/229 |
| 2,405,494 A * | 8/1946 | Dupuy | ................ | F24F 6/12 96/340 |
| 2,703,228 A * | 3/1955 | Fleisher | ................ | B01D 47/18 96/235 |
| 2,839,901 A * | 6/1958 | Green | ................ | F25B 9/04 60/784 |
| 3,208,229 A * | 9/1965 | Fulton | ................ | C03B 27/0404 55/455 |
| 3,504,481 A * | 4/1970 | Zakarian | ................ | B01D 53/34 96/53 |
| 3,716,045 A * | 2/1973 | Vollhardt | ................ | F28C 3/06 126/350.1 |
| 4,251,485 A * | 2/1981 | Schauer | ................ | B01D 53/34 261/121.1 |
| 4,274,845 A * | 6/1981 | Howard | ................ | B01D 45/10 126/299 E |
| 4,313,307 A * | 2/1982 | Sisk | ................ | F25B 1/00 62/238.6 |
| 4,330,510 A * | 5/1982 | Schauer | ................ | B01D 53/34 423/210 |
| 4,380,910 A * | 4/1983 | Hood | ................ | F24F 5/0035 62/271 |
| 4,407,134 A * | 10/1983 | Snaper | ................ | F25B 9/04 55/312 |
| 4,432,777 A * | 2/1984 | Postma | ................ | B01D 47/021 261/122.1 |
| 4,697,735 A * | 10/1987 | Temple | ................ | F24F 6/00 236/44 C |
| 4,698,979 A * | 10/1987 | McGuigan | ................ | F24F 1/022 62/171 |
| 4,829,781 A * | 5/1989 | Hitzler | ................ | B01D 3/007 62/171 |
| 5,076,819 A * | 12/1991 | Sharrow | ................ | A47L 9/182 95/151 |
| 5,078,759 A * | 1/1992 | Kira | ................ | B01D 47/021 261/121.1 |
| 5,080,793 A * | 1/1992 | Urlings | ................ | B01D 53/84 210/603 |
| 5,215,560 A * | 6/1993 | Lee | ................ | A47L 9/181 96/330 |
| 5,540,058 A * | 7/1996 | Yi | ................ | B01D 53/002 62/641 |
| 5,873,930 A * | 2/1999 | Sanchez | ................ | A47L 9/181 55/445 |
| 5,908,491 A * | 6/1999 | Hobbs | ................ | F24F 3/16 95/202 |
| 6,572,689 B2 * | 6/2003 | Cosby, II | ................ | F25B 15/02 62/495 |
| 6,616,733 B1 * | 9/2003 | Pellegrin | ................ | B01D 47/04 95/150 |
| 6,626,983 B1 * | 9/2003 | Cairns | ................ | F01N 3/04 95/226 |
| 6,761,756 B1 * | 7/2004 | Gomez | ................ | F24F 3/16 96/329 |
| 6,766,655 B1 * | 7/2004 | Wu | ................ | F28B 1/06 165/110 |
| 7,150,160 B2 * | 12/2006 | Herbert | ................ | F24F 12/006 62/274 |
| 7,549,418 B1 * | 6/2009 | Moorman | ................ | F24D 11/003 126/623 |
| 7,988,909 B1 * | 8/2011 | Ruan | ................ | A61L 9/145 422/4 |
| 8,313,564 B2 * | 11/2012 | Kwack | ................ | B01D 47/021 95/223 |
| 8,758,680 B2 * | 6/2014 | Hishida | ................ | B01D 47/024 422/5 |
| 10,456,736 B2 * | 10/2019 | Zhu | ................ | B01D 53/1406 |
| 2002/0040575 A1 * | 4/2002 | Okano | ................ | F02C 6/18 60/39.511 |
| 2002/0116933 A1 * | 8/2002 | Chu | ................ | H05K 5/0213 62/93 |
| 2002/0187083 A1 * | 12/2002 | Bundy | ................ | B01D 46/02 422/171 |
| 2004/0134212 A1 * | 7/2004 | Lee | ................ | F24F 3/1417 62/271 |
| 2005/0109209 A1 * | 5/2005 | Lee | ................ | B01D 45/12 95/149 |
| 2005/0145108 A1 * | 7/2005 | Rubin | ................ | B01D 53/78 95/226 |
| 2008/0017032 A1 * | 1/2008 | Pellegrin | ................ | B01D 47/04 95/150 |
| 2008/0260574 A1 * | 10/2008 | Kapitoures | ................ | B01D 47/14 422/4 |
| 2008/0271603 A1 * | 11/2008 | Triplett | ................ | A61L 9/014 95/150 |
| 2010/0126702 A1 * | 5/2010 | Tsunemori | ................ | F24F 5/0035 165/104.29 |
| 2012/0093683 A1 * | 4/2012 | Hishida | ................ | A61L 9/122 422/4 |
| 2012/0318009 A1 * | 12/2012 | Duesel, Jr. | ................ | B01D 1/305 62/121 |
| 2014/0056765 A1 * | 2/2014 | Henriot | ................ | A61L 2/208 422/120 |
| 2015/0198072 A1 * | 7/2015 | Alasmari | ................ | B01D 50/006 60/274 |

FOREIGN PATENT DOCUMENTS

| | | | | |
|---|---|---|---|---|
| DE | 2636173 A1 * | 2/1978 | .............. | F24F 3/147 |
| DE | 4314788 C1 * | 8/1994 | .............. | B01D 47/10 |
| DE | 4338177 A1 * | 5/1995 | .............. | A47L 9/181 |
| DE | 29518530 U1 * | 1/1996 | .............. | B01D 50/006 |
| DE | 19526980 A1 * | 1/1997 | .............. | B01D 53/14 |
| DE | 10153452 A1 * | 5/2003 | .............. | F28D 13/00 |
| EP | 1160518 A1 * | 12/2001 | .............. | F24F 6/04 |
| FR | 1397491 A * | 4/1965 | .............. | F28C 3/10 |
| FR | 2723433 A1 * | 2/1996 | .............. | B01D 50/008 |
| FR | 2746666 A1 * | 10/1997 | .............. | B01D 47/021 |

(56) References Cited

FOREIGN PATENT DOCUMENTS

| | | | | |
|---|---|---|---|---|
| FR | 2944587 A1 | * | 10/2010 | ............ F24F 3/1405 |
| FR | 2966225 A1 | * | 4/2012 | ........... B60H 1/3202 |
| FR | WO 2012153163 A1 | * | 11/2012 | ............ F24F 3/1405 |
| GB | 905048 A | * | 9/1962 | ................ F28C 3/06 |
| JP | 54122460 A | * | 9/1979 | |
| JP | S58196721 U | | 12/1983 | |
| JP | 62069033 A | * | 3/1987 | |
| JP | S63101640 A | | 5/1988 | |
| JP | S6383413 U | | 6/1988 | |
| JP | S63273746 A | | 11/1988 | |
| JP | H01131926 U | | 9/1989 | |
| JP | WO 9719301 A1 | * | 5/1997 | ................ F24F 5/00 |
| JP | 2004188120 A | | 7/2004 | |
| JP | 2008082609 A | | 4/2008 | |
| SU | 588450 A1 | | 1/1978 | |
| WO | WO-9831970 A1 | * | 7/1998 | ............ F24F 3/1603 |
| WO | WO-0190001 A1 | * | 11/2001 | ............ C02F 1/4674 |
| WO | 2006138287 A2 | | 12/2006 | |
| WO | WO-2009153404 A1 | * | 12/2009 | ........... B01D 5/0027 |
| WO | WO-2013039329 A2 | * | 3/2013 | ................ F24F 6/14 |

OTHER PUBLICATIONS

DE2636173A1 English Machine Translation—Retrieved Aug. 2017.*
JPS54122460A English Machine Translation—Retrieved Aug. 2017.*
FR 2723433 English Machine Translation (Year: 1996).*

* cited by examiner

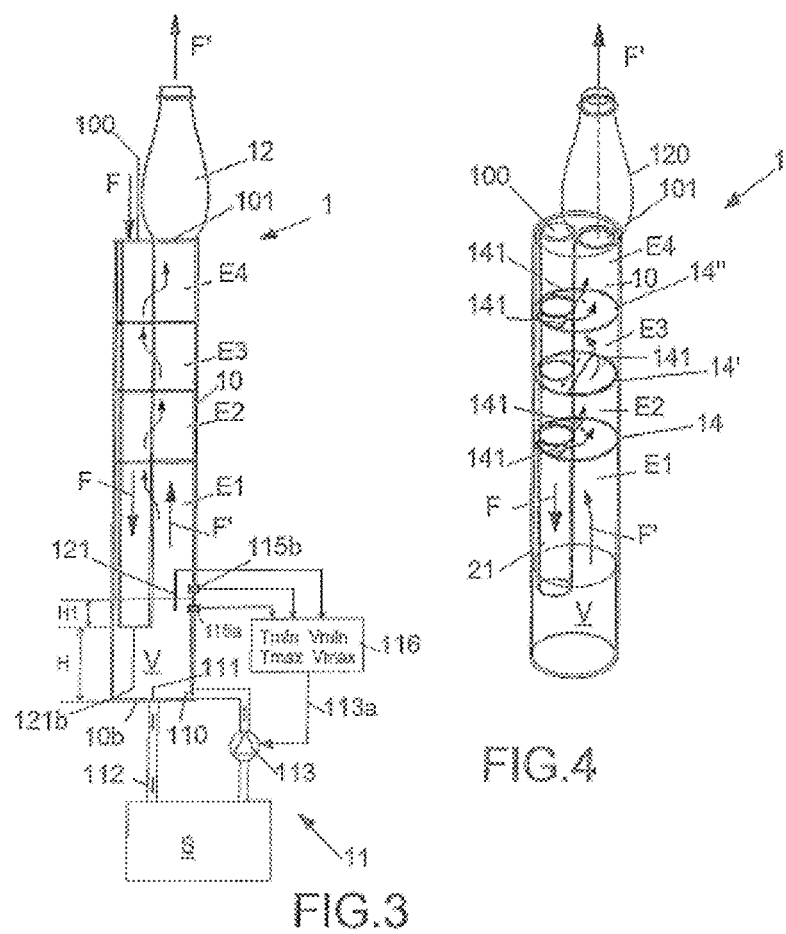

DEVICE FOR PRODUCING A STREAM OF AIR THROUGH A VOLUME OF LIQUID

TECHNICAL FIELD

The present invention relates to the production of a stream of air through a volume of liquid. It in particular applies to various fields, for example including, but not limited to, the production of a stream of air that is heated or cooled upon passing through said volume of liquid, the production of a stream of air whereof the temperature is controlled and/or whereof the absolute humidity is controlled, the humidification or dehumidification of a stream of air, the cleanup or filtration of a stream of air, the heating or air-conditioning of greenhouses, the heating or air-conditioning of industrial, service or household sites or buildings, monitoring the hygrometry of industrial, service or household sites or buildings. The produced stream of air may also be used to cool, heat, humidify or dehumidify any type of surface.

PRIOR ART

The use of the thermal conductivity and latent heat of a liquid, for example water, to heat or cool a stream of air by heat exchange between the liquid and the stream of air, with direct placement in contact of the stream of air and the liquid, is an old technique, which has the advantage of being ecological, since it in particular avoids using heat transfer fluids such as refrigerants. The heating or cooling of the stream of air may for example be intended to produce a stream of air having a controlled temperature and/or intended to produce a stream of air having a controlled absolute humidity.

A first known solution for carrying out this technique consists of passing the stream of air through a curtain of fine droplets of the liquid or through an air-permeable exchange surface containing this liquid, for example a textile material imbibed with water. The main drawback of this type of solution lies in the very low energy output of the heat exchange between the liquid and the stream of air, and the low air flow rates that may be obtained.

A second known solution consists of passing the stream of air directly through a volume of liquid contained in an enclosure, by injecting the stream of air in the volume of liquid, below the surface of said volume of liquid. This type of solution is for example described in international patent application WO 2006/138287 and in American patents U.S. Pat. No. 4,697,735 (FIG. 3) and U.S. Pat. No. 7,549,419. This second technical solution has the advantage of making it possible to achieve higher energy performance levels of the heat exchange between the liquid and the stream of air.

AIM OF THE INVENTION

One aim of the invention is to propose a new technical solution making it possible to improve the production of a stream of air through a volume of liquid contained in an enclosure.

BRIEF DESCRIPTION OF THE INVENTION

According to a first aspect, the invention thus relates to a device for producing a stream of air comprising an enclosure, which is intended to contain a volume of liquid, and which includes at least one air discharge opening, air injection means that make it possible to create and pass an incoming stream of air from the outside of the enclosure in a volume of liquid contained in the enclosure, by injecting said stream of air in said volume of liquid, below the surface of said volume of liquid, such that an outgoing stream of air, treated by direct contact with the volume of liquid, is discharged outside said enclosure by passing through the air discharge opening of the enclosure. The enclosure includes one or more baffles that are positioned between the volume of liquid and said discharge opening, and that make it possible to circulate the stream of air leaving the volume of liquid to the discharge opening, causing said stream of air to undergo one or more changes in direction, so as to prevent the spreading of liquid through the air discharge opening.

When the stream of air crosses through the volume of liquid, in particular depending on how the air is injected in the volume of liquid, and depending on the air flow rate and the volume of liquid, more or less significant turbulence occurs in the volume of liquid that may cause spraying of drops that are driven by the stream of air. The baffles of the device according to the invention form an obstacle on the path of these drops and make it possible to reduce the risks of these drops being driven by the stream of air to the discharge opening. It advantageously results from this that the flow rate of the stream of air may be very high and/or that the volume of the enclosure may be small, which reduces the bulk of the device, while avoiding spraying drops of liquid outside the enclosure of the device.

More particularly, the device according to the invention may include the following additional and optional features, considered alone or in combination with one another:

- each baffle is a plate that is fastened inside the enclosure while being in tight contact over its entire periphery with the enclosure, and that includes at least one through opening for the passage of stream of air exiting through the plate.
- The device includes several baffles whereof the through openings are not aligned with the air discharge opening of the enclosure.
- the enclosure includes an upper wall, a bottom wall and a side wall connecting the upper wall and the bottom wall, and in which the intake opening and the discharge opening are made in the upper wall of the enclosure.
- the device includes temperature control means that automatically make it possible to keep the temperature of said volume of liquid in the enclosure at a predefined temperature ($T_{liquid}$).
- the temperature control means make it possible to renew the liquid in the enclosure so as to automatically keep, in the enclosure, a predefined volume of liquid at a predefined temperature ($T_{liquid}$).
- the air injection means include a tube that is positioned inside the enclosure, which is connected to the air intake opening, and which includes an air outlet submerged in the volume of liquid.
- each baffle includes a through opening for the passage of the tube, and the tube is passed through said through opening of each baffle, while being in tight contact over its entire outer periphery with the baffle at each through opening.
- the air injection means make it possible to inject the stream of air entering the volume of liquid at a depth comprised between 20 mm and 80 mm.
- the air injection means include an air compressor, which is outside the enclosure, and the outlet of which could be connected or is connected to the air intake opening of the enclosure.

- the air injection means include an air compressor, which is outside the enclosure, and the intake of which could be connected or is connected to the air discharge opening of the enclosure.
- the air injection means include a single air compressor, which is outside the enclosure, and the device has two operating modes: a first operating mode in which the outlet of the compressor can be connected or is connected to the air intake opening of the enclosure, and a second operating mode in which the intake of the compressor can be connected or is connected to the air discharge opening of the enclosure.
- the air compressor is of the centrifugal type.
- the air compressor allows heating of the air passing through the air compressor with a temperature gradient $\Delta T$ of at least 2° C.
- the air injection means make it possible to create and introduce said stream of air with an air flow rate of at least 100 m³/h.
- the device includes means for controlling the temperature of the volume of liquid, which make it possible to adjust the temperature of the volume of liquid contained in the enclosure (10) as a function of at least one predefined hygrometry setpoint ($HR_{cons}$) so as to automatically adjust the absolute humidity of said stream of air (F') leaving the enclosure.
- The device includes at least one humidity sensor, the means for controlling the temperature of the volume of liquid make it possible to adjust the temperature of the volume of liquid contained in the enclosure as a function of the humidity measured by the humidity sensor and at least one predefined hygrometry setpoint ($HR_{cons}$).

The invention also relates to a method for producing a stream of air using the aforementioned device and in which the enclosure of the device contains a volume of liquid, and in particular a volume of water.

More particularly, the method according to the invention may include the following additional and optional features, considered alone or in combination with one another:
- the height (H+H1) of the volume of liquid is below 200 mm, and preferably approximately 100 mm.
- the temperature of the volume of liquid is kept at a predefined temperature ($T_{liquid}$) that is different from the temperature ($T_{initial}$) of the stream of air (F) entering the enclosure.
- the method allows the production of a heated stream of air, and the temperature ($T_{liquid}$) of the liquid in the enclosure is higher than the temperature ($T_{initial}$) of the stream of air entering the enclosure.
- the temperature of the heated stream of air is substantially equal to or slightly higher than the temperature ($T_{liquid}$) of the liquid.
- The method allows the production of a cooled stream of air, and the temperature of the liquid ($T_{liquid}$) is lower than the temperature ($T_{initial}$) of the stream of air entering the enclosure.
- the temperature of the cooled stream of air is substantially equal to the temperature ($T_{liquid}$) of the liquid.
- the flow rate of the stream of air entering the enclosure is at least 100 m³/h.
- the ratio between the air flow rate entering the enclosure and the volume of liquid contained in the enclosure is greater than $10^4 h^{-1}$.
- the stream of air coming from outside the enclosure and entering the enclosure includes particles and/or pollutants, and at least part of these particles and/or pollutants are captured in the liquid contained in the enclosure.

The invention also relates to a use of one or several of the aforementioned devices, to heat a site or to cool a site and/or to humidify and/or dehumidify a site, and in particular a greenhouse. The facility includes at least one aforementioned device, which is arranged such that the air that is injected in the enclosure of the device is air coming from outside the site.

More particularly, the facility according to the invention may include the following additional and optional features, considered alone or in combination with one another:
- the facility makes it possible to heat or humidify a site, and further includes a heat exchanger connected to the enclosure of the device, such that the heated air coming from the enclosure crosses through said heat exchanger, before being injected inside the site, and air recycling means that make it possible to supply the heat exchanger with recycled air coming from inside the site, such that the air coming from the device and crossing through a heat exchanger is heated by said recycled air coming from inside the site.
- the facility further includes an air heating device positioned between the heat exchanger and the inside of the site, so as to preheat the air coming from the device and crossing through the heat exchanger before it is introduced in the site.
- the facility makes it possible to cool or dehumidify a site, and further includes a heat exchanger connected to the enclosure of the device, and air recycling means that make it possible to supply the heat exchanger with recycled air coming from inside the site, such that the air injected in the enclosure of the device is cooled beforehand, by crossing through the heat exchanger, by said recycled air coming from inside the site.

The invention also relates to a use of one or several of the aforementioned devices, to heat a site or to cool a site, or to humidify a site or to dehumidify a site.

BRIEF DESCRIPTION OF THE FIGURES

The features and advantages of the invention will appear more clearly upon reading the following detailed description of specific alternative embodiments of the invention, the specific alternative embodiments being described as non-limiting and non-exhaustive examples of the invention, and in reference to the appended drawings, in which:

FIG. 3 diagrammatically shows another alternative embodiment of the device of FIG. 1.

FIG. 4 is an isometric view of the device of FIG. 3, without the renewal means for the liquid in the enclosure.

DETAILED DESCRIPTION

Figures 1, 2:
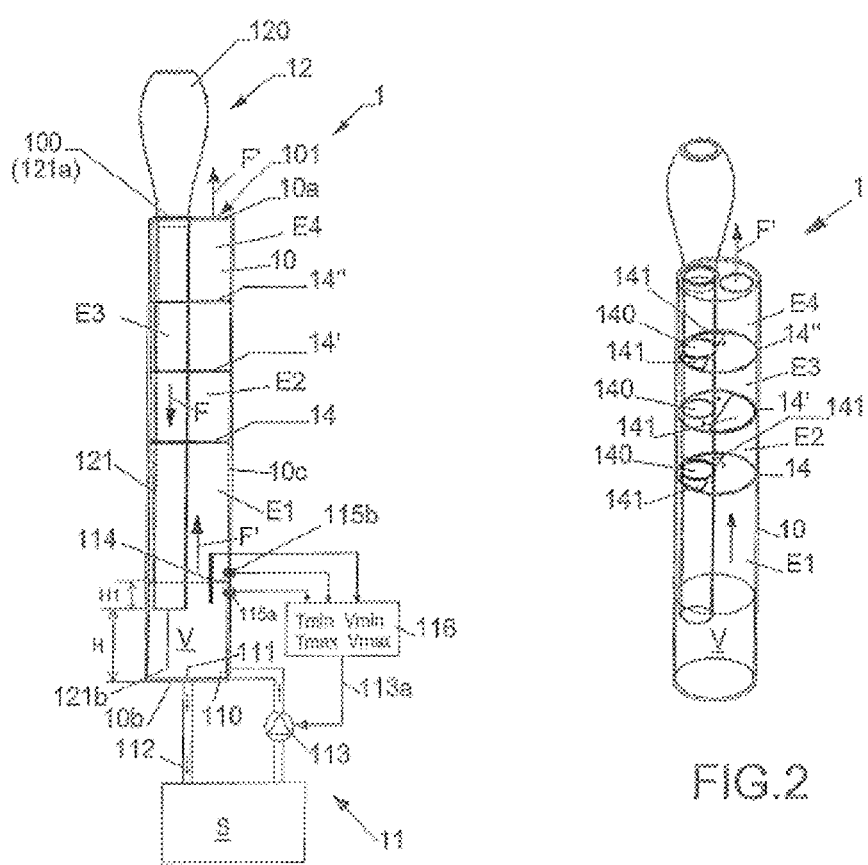
FIG. 1 diagrammatically shows an alternative embodiment of a device according to the invention making it possible to produce a stream of air through a volume of liquid.
FIG. 2 is an isometric view of the device of FIG. 1, without the renewal means for the liquid in the enclosure.

In reference to the specific alternative embodiment of FIGS. 1 to 4, the device 1 for producing a stream of air includes a closed enclosure 10, which comprises an upper wall 10a, a bottom wall 10b and a side wall 10c connecting the upper wall 10a to the bottom wall 10b.

In this particular example, the side wall 10c of the enclosure 10 has a tubular shape, but could have any other shape in the context of the invention.

The enclosure 10 contains, in the bottom, a volume of liquid V, with height H, the temperature of which is controlled. This liquid is preferably water, but it is possible to use any type of liquid in the context of the invention.

The enclosure 10 also includes an air intake opening 100 and an air discharge opening 101 positioned outside the volume of liquid V. In this alternative of FIGS. 1 to 4, but non-limitingly with respect to the invention, the air intake opening 100 and the discharge opening 101 are made in the upper wall 10a of the enclosure 10.

The device 1 includes renewal means 11 for the liquid contained in the enclosure. These renewal means 11 serve to automatically supply the enclosure 10 with liquid, so as to maintain a predefined volume of liquid V in the enclosure 10, at a predefined temperature.

The device 1 also includes air injection means 12, which make it possible to create and inject, in the volume V of liquid contained in the enclosure 10, an incoming stream of air F coming from outside the enclosure 10. In the specific alternative illustrated in FIGS. 1 to 4, these air injection means 12 more particularly include an air compressor 120, for example of the fan type, and an injection tube 121.

The injection tube 121 is open at both its upper 121a and lower 121b ends. The upper open end 121a of the tube 121 is connected to the air intake opening 100 of the enclosure 10. The lower open end 121b of the tube 121 forms an air outlet and is submerged in the volume of liquid V, while being positioned at a depth $H_1$, which corresponds to the distance between the surface of the volume of liquid V and the air outlet 121b of the tube 121.

In this alternative embodiment, depending on the operating mode of the device (by blowing air/FIGS. 1 and 2; by suctioning air/FIGS. 3 and 4), the air compressor 120 is connected to the air intake opening 100 of the enclosure 10 or to the air discharge opening 101 of the enclosure 10.

The device 1 also includes several plates 14, 14', 14" serving as baffles, which are positioned between the volume of liquid V and the air discharge opening 101 of the enclosure 10. These plates 14, 14', 14" are fastened to the inside of the enclosure 10, one above the other, with a space between plates 14, so as to form several superimposed chambers E1, E2, E3 and E4. Each plate 14, 14', 14" is in tight contact over its entire periphery with the side wall 10c of the enclosure 10. The first chamber E1 is defined by the surface of the volume of liquid V and the lower plate 14.

The second chamber E2 is defined by the lower plate 14 and the intermediate plate 14'. The third chamber E3 is defined by the intermediate plate 14' and the upper plate 14". The third chamber E4 is defined by the upper plate 14" and the upper wall 10a of the enclosure 10.

The number of plates 14, 14', 14" and of chambers E1, E2, E3 and E4 are not limiting with respect to the invention, the device 1 being able to include a single plate 14 defining two chambers or more than three plates defining more than four chambers.

Each plate 14, 14', 14" includes a through opening 140 have substantially the same section as the injection tube 121. These through openings 140 are vertically aligned, and the injection tube 121 is passed through these openings 140, the tube 121 being in tight contact over its entire outer periphery with each plate 14, 14', 14" at each passage opening 140 of the tube.

Each plate 14, 14', 14" also includes at least one through opening 141 making it possible to make two adjacent chambers communicate with one another, and thus allowing the passage of a stream of air F' leaving the volume of liquid V, and which for example has been cooled or heated by the liquid, from one chamber to the other from the lower chamber E1 to the discharge opening 101.

These openings 141 are vertically offset relative to one another and are not aligned with the air discharge opening 101 of the enclosure 10, so as to cause said stream of air F' to undergo several changes of direction.

In the specific alternative of FIGS. 1 and 3, the renewal means 11 for the liquid in the enclosure 10 include:

an intake opening for the liquid 110 formed in the side wall 10c of the enclosure 10 near the bottom wall 10b of the enclosure 10;

a discharge opening for the liquid 111 formed in the bottom wall 10b of the enclosure;

a discharge tubing 112 for the liquid that is connected at one end to the discharge opening 111 of the enclosure 10, and in this particular example is connected at its other end to a liquid source S;

pumping means 113, of the hydraulic pump type, that are connected to the liquid source S and the intake opening 110 of the enclosure, and that make it possible to pump liquid in the liquid source S and inject it in the enclosure 10 through the intake opening 110, so as to renew the liquid in the enclosure.

In the context of the invention, the discharge tubing 112 of the liquid is not necessarily connected to the liquid source S.

The renewal means 11 for the liquid in the enclosure 10 for example include:

at least one temperature sensor 114 making it possible to measure the temperature of the volume of liquid V in the enclosure 10;

at least one low-level sensor 115a and one high-level sensor 115b making it possible to measure the level H of liquid in the enclosure;

electronic processing means 116, for example of the industrial programmable automaton or electronic control/command board type, which are connected to the temperature sensor 114 and the level sensors 115a and 115b, and that deliver, as output, a command signal 113a making it possible to control the pumping means 113.

The electronic processing means 116 are designed, and are more particularly for example programmed, to control the pumping means 113 using the control signal 113a, for measuring signals delivered by the temperature sensor 114 and by the level sensors 115a and 115b, and as a function of minimum Tmin and maximum Tmax temperature setpoints, and minimum Vmin and maximum Vmax liquid volume (or level) setpoints, so as to constantly keep, in the enclosure 10, a volume of liquid V comprised between said minimum setpoint value (Vmin) and said maximum setpoint value (Vmax), and kept at a temperature $T_{liquid}$ that is comprised between said minimum setpoint temperature (Tmin) and said maximum setpoint temperature (Tmax).

FIGS. 1 and 2 illustrate a first embodiment and operating mode of the device 1, in which the stream of air F entering the enclosure 10 is created by blowing air into the tube 121.

In this embodiment, the air discharge opening 101 of the enclosure 10 is in the open air. The outlet of the air compressor 120 is connected to the air intake opening 100 of the enclosure 10, and the intake of the air compressor 120 is in the open air. When the air compressor 120 is operating, it suctions air coming from outside the enclosure 1 and pushes that air into the injection tube 121 through the air intake opening 100, in the form of an entering stream of air F, that is at an initial temperature $T_{initial}$ substantially corresponding to the temperature of the ambient air outside the enclosure 10, or optionally at an initial temperature $T_{initial}$ that may be slightly higher than the temperature of the ambient air outside the enclosure 10 due to the passage of the air in the compressor 120.

This stream of air F entering at the initial temperature $T_{initial}$ is injected, at the outlet of the tube 121, directly in the volume of liquid V, below the surface of the volume of liquid V, and passes through this volume of liquid V, which is at a temperature $T_{liquid}$ (comprised between $T_{min}$ and $T_{max}$) different from the initial temperature $T_{initial}$. During the passage of this stream of air in the volume of liquid V, a heat exchange occurs by direct contact between the air and the liquid, such that the air (cooled or heated depending on the case) leaves the volume of liquid and a stream of cooled or heated air F' rises in the enclosure 10 to be discharged through the discharge opening 101. This stream of air F' at the outlet of the enclosure has a final temperature $T_{final}$ close, and preferably substantially identical, to the temperature $T_{liquid}$ of the volume of liquid V contained in the enclosure.

When the temperature of the liquid $T_{liquid}$ is lower than the initial temperature $T_{initial}$, the stream of air F' after passage in the air of the volume of liquid V has been cooled. This concomitantly results in the stream of air F' leaving the device 1 having been dehumidified relative to the incoming stream of air F, the absolute humidity (water weight per volume of air) in the exiting stream of air F' being lower than the absolute humidity of the entering stream of air F. Conversely, when the temperature of the liquid $T_{liquid}$ is higher than the initial temperature $T_{initial}$, the stream of air F' after passage in the air of the volume of liquid V has been heated. This concomitantly results in the stream of air F' leaving the device 1 having been humidified relative to the incoming stream of air F, the absolute humidity (water weight per volume of air) in the exiting stream of air F' being higher than the absolute humidity of the entering stream of air F.

The stream of air F' cooled or heated to a final temperature $T_{final}$ close, and preferably substantially identical, to the temperature $T_{liquid}$ of the volume of liquid V, rises inside the enclosure 10 while circulating through the baffles 14, 14', 14", and undergoing several successive changes in direction, then is discharged outside the enclosure 10 through the discharge opening 101.

FIGS. 3 and 4 illustrate a second embodiment and operating mode of the device 1, in which the stream of air F entering the enclosure 10 is created by suction.

In this embodiment, the air intake opening 100 of the enclosure is in the open air. The intake of the air compressor 120 is connected to the air discharge opening 101 of the enclosure 10, and the outlet of the air compressor 120 is in the open air. When the air compressor 120 is operating, a stream of air F coming from outside the enclosure 1 is created by suction in the injection tube 121 through the air intake opening 110. The initial temperature $T_{initial}$ of this stream of air F corresponds to the temperature of the ambient air outside the enclosure 10. The stream of air F', cooled or heated after passage of the air in the volume of liquid V, rises in the enclosure passing through the baffles 14, 14', 14", then passes through the compressor 120 and is blown outside the enclosure 10 in the form of a stream of air cooled or heated to a final temperature $T_{final}$ close to, and preferably substantially identical to or slightly higher than, the temperature $T_{liquid}$ of the volume of liquid V.

In both of the aforementioned operating modes, the air flow rate entering the enclosure 10 is equal to the air flow rate leaving the enclosure 10. Turbulence occurs in the volume of liquid V that may be significant, and that may cause liquid drops to be sprayed, these drops being driven by the stream of air F' heated or cooled. The baffles 14, 14', 14" of the device according to the invention form an obstacle on the path of these drops and make it possible, owing to the successive changes in direction of the air imposed by the baffles, to prevent the liquid from being sprayed through the discharge opening 101 outside the enclosure at the same time as the cooled or heated stream of air F'. Owing to the baffles 14, 14', 14", no drop of liquid is sprayed outside the enclosure. It advantageously results from this that the flow rates of the streams of air F and F' may be very high and/or that the volume of the enclosure may be small, which reduces the bulk of the device, while avoiding spraying drops of liquid outside the enclosure of the device.

During the operation of the device 1, the inert and/or living particles, and in particular dust, in the air around the device 1 are advantageously suctioned into the device 1 and are filtered while being captured in the volume of liquid V contained in the enclosure 10, which makes it possible to obtain cleaner air at the outlet of the device 1. Typically, all of the particles greater than 2 µm can be filtered by the device 1.

In another alternative embodiment, the device 1 according to the invention may be used to filter or clean the incoming stream of air F by passing through a volume of liquid. In this application, the temperature of the volume of liquid may be higher or lower than the temperature of the incoming stream of air F, or be substantially equal to the temperature of the incoming stream of air F. When the temperature of the volume of liquid is substantially equal to the temperature of the incoming stream of air F, at the outlet of the device 1, an outgoing stream F' of filtered or cleaned air is produced that has not been heated or cooled, but that is at substantially the same temperature as the incoming stream of air F.

In another alternative embodiment, the liquid renewal means 11 may be replaced by heating or cooling means for the volume of liquid V, which make it possible to maintain the temperature of the volume of liquid without necessarily renewing the liquid in the enclosure.

The invention advantageously makes it possible to work with an air flow rate at the outlet of the compressor 120 that may be significant, and in particular higher than 100 m³/h. In one particular embodiment, the volume of the enclosure 10 was approximately 5 liters. The volume of liquid V in the enclosure 10 was smaller than 3 liters. The invention is not, however, limited to these particular air flow rate and volume values.

More particularly, in the context of the invention, the ratio between the air flow rate entering the enclosure and the volume V of liquid present in the enclosure 10 may advantageously be $10^4$ h$^{-1}$. The invention thus allows a low liquid consumption and advantageously makes it possible to keep, at the required temperature, a small volume of liquid in the enclosure 10, which requires less energy compared to a larger volume.

During operation, due to the heat exchanges between the air and the liquid, the liquid cools (if $T_{Liquid} > T_{Initial}$) or heats (if $T_{Liquid} < T_{Initial}$). The liquid renewal means 11 make it possible to renew the liquid in the enclosure with new liquid at the required temperature so as, in the enclosure 10, a predefined volume of liquid V, substantially at the predefined temperature $T_{liquid}$.

The depth H1 of the air outlet of the injection tube 121 must be great enough for the treatment of the stream of air by passing through the volume of liquid V, and more particularly so that if applicable, the heat transfer between the liquid and the air injected in the volume of liquid V is effective and sufficient, and if applicable allows the stream of air F' cooled or heated by the liquid to be at a temperature close to, and preferably substantially identical to, that of the liquid. Conversely, this depth H1 must not be too great, so as to avoid oversizing the air compressor 121. The depth H1 is thus preferably comprised between 20 mm and 80 mm. Likewise, for better efficiency, the height (H+H1) of the volume of liquid V must preferably not be too great, and will preferably be less than 200 mm, and more particularly approximately 100 mm. The invention is not, however, limited to these particular values.

The compressor 120 may be of any known type of air compressor making it possible to create a stream of air (centrifugal fan, axial fan, pump, etc.).

Nevertheless, the air compressor 120 is preferably a centrifugal air compressor, since this type of compressor advantageously makes it possible to obtain significant air flow rates, and also to obtain a significant temperature difference ΔT of the air between the outlet of the compressor 120 and the inlet of the compressor, for example compared to an axial compressor. In practice, this temperature difference ΔT for a centrifugal air compressor is at least 2° C. and may reach 4° C., the air leaving the compressor being at a temperature higher than the air entering the compressor.

Preferably, the operating mode of FIGS. 1 and 2 may be used in the summertime to perform air conditioning or dehumidification of a site, by producing one or more streams of air F' cooled using one or more devices 1, from the hot air taken from outside the site. The liquid source S may advantageously be a water table or a cold water tank buried at a depth or cooled using any known cooling system.

Conversely, the operating mode of FIGS. 3 and 4 is preferably used in the winter to heat or humidify a site, by producing one or more streams of air F' heated using one or more devices 1, from the cold air taken from outside the site. The liquid source S is a hot water source in this case, for example a heated water tank, a heated outside water basin, for example using solar energy, a water table or a hot water tank. In this case, the implementation of an air compressor 120 of the centrifugal type advantageously makes it possible to use a temperature differential ΔT to increase the temperature of the air leaving the compressor 120 relative to the temperature of the air at the discharge opening 101 of the enclosure 10, which improves the energy performance.

In both operating mode, the invention applies to any type of site. The site may be of the industrial, household or service type. The site may also be a greenhouse or a hanger. In both operating modes, the invention advantageously allows continual renewal of the air inside the site.

The device 1 according to the invention may also produce a stream of hot air or cooled and/or humidified or dehumidified air directed over any type of surface to heat or cool and/or humidify or dry that surface.

Figure 5:
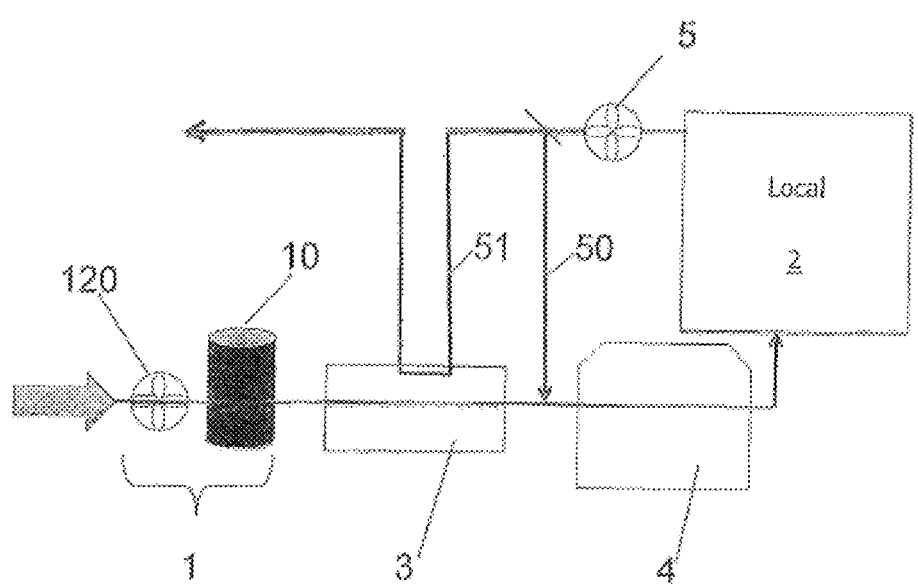
FIG. 5 diagrammatically shows a facility for heating a site.

FIG. 5 diagrammatically shows a facility for heating and/or humidifying a site 2. This facility includes one or more devices 1 for producing a stream of heated air, of the type for example of the device of FIG. 1 working by blowing. In another alternative, it is nevertheless also possible to implement devices 1 of FIG. 4 working by suction.

The number of devices 1 for producing a stream of heated air will in particular depend on the air flow rates of the devices 1 and the volume of the site 2. The devices 1 will be carefully distributed in the volume of the site 2.

Each device 1 is arranged in the site 2 such that the air that is injected in the enclosure 10 of the device 1 is cold air coming from outside the site. The enclosure 10 of each device 1 is further connected at its outlet to a heat exchanger 3, such that the heated air leaving the device 1 crosses through said heat exchanger 3, then is injected at the outlet of an air heating device, for example comprising heating electric resistances or plate exchangers. The air preheated by the air heating device 4 is next injected inside the site 2.

The facility also includes recycling means 5 making it possible to renew the air in the site by suctioning it and discharging it outside the site 2, so as to keep the temperature of the air inside the site at a predefined setpoint temperature. Part of this hot air coming from the site 2 (FIG. 5/branch 50) is recycled while being reinjected inside the site 2 downstream from the heat exchanger 3. Another part of this hot air coming from the site 2 (FIG. 5/branch 51) is sent into the heat exchanger 3, and crosses through said heat exchanger 3, such that the air coming from the device 1 is heated by this hot air coming from the site 2. In this facility, the temperature of the liquid in the enclosure 10 of each device 1 is below the temperature of the hot air coming from the site 2.

The heat exchanger 3 may be of any known type of heat exchanger allowing a heat exchange between two fluids, in particular without placing the two fluids in direct contact.

The implementation of this heat exchanger 3 advantageously allows heating of the air leaving the devices 1 with hot air coming from the site, and thereby makes it possible to reuse part of the calories from this hot air and to work with a lower liquid temperature in the devices 1. The energy consumption is thus reduced.

As a non-limiting example, in one specific alternative embodiment, the temperature of the air injected in the enclosure 10 was below 15° C. and for example below 0° C., and the relative humidity level of this air was for example approximately 90%-100%. The temperature of the liquid in the enclosure 10 was kept at approximately 15° C. The temperature of the air leaving each device 1 was thus approximately 15° C. The temperature of the air leaving the air heating device 4 and entering the site 2 was approximately 22° C. The temperature of the site 2 was kept around 19° C. with a relative humidity level of that air for example of approximately 60%.

Figure 6:
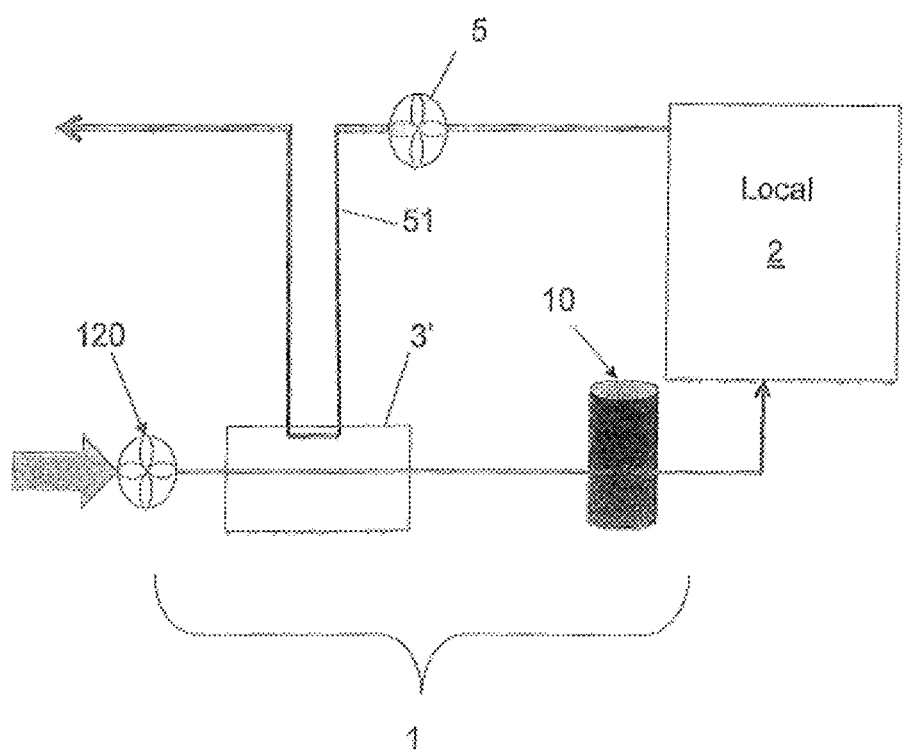
FIG. 6 diagrammatically shows a facility for cooling a site.

FIG. 6 diagrammatically shows a facility for cooling (air-conditioning) and/or dehumidifying a site 2. This facility includes one or more devices 1 for producing a stream of cooled air, of the type for example of the device of FIG. 1 working by blowing. In another alternative, it is nevertheless also possible to implement devices 1 of the type of FIG. 4 working by suction. The number of devices 1 for producing a stream of cooled air will in particular depend on the air flow rates of the devices 1 and the volume of the site 2. The devices 1 will be carefully distributed in the volume of the site 2.

Each device 1 is arranged in the site 2 such that the air that is injected in the enclosure 10 of the device 1 is hot air coming from outside the site. The facility further includes a heat exchanger 3' that is positioned between the air compressor 120 of each device and the enclosure 10 of each device 1, such that the hot air coming from outside the site 2 crosses through said heat exchanger 3', then is injected in the enclosure 10 of each device 1.

The facility also includes air recycling means 5 making it possible to renew the air in the site by suctioning it and discharging it outside the site 2, so as to keep the temperature of the air inside the site at a predefined setpoint temperature. This recycled cold air coming from the site 2 (FIG. 6/branch 51) is sent into the heat exchanger 3', and crosses through said heat exchanger 3, such that the hot air coming from the outside, before it is injected in the enclosure 10 of each device 1, is cooled by this recycled cold air coming from the site 2. In this facility, the temperature of the liquid in the enclosure 10 of each device 1 is below the temperature of the cold air coming from the site 2.

The heat exchanger 3' may be of any known type of heat exchanger allowing a heat exchange between two fluids, in particular without placing the two fluids in direct contact.

The implementation of this heat exchanger 3' advantageously allows pre-cooling of the air before it is injected in the enclosure 10 of each device 1 with air coming from the site 2, and thereby makes it possible to reuse part of the calories from this air. The energy consumption is thus reduced.

Figure 7:
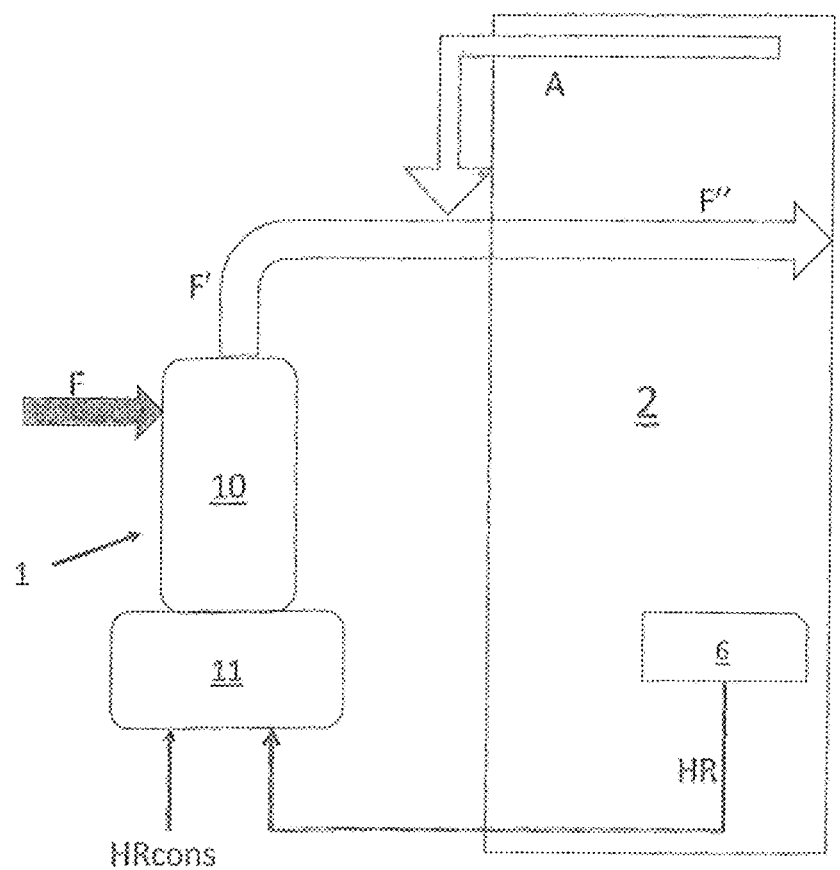
FIG. 7 diagrammatically shows a facility making it possible to adjust the humidity of a site.

As a non-limiting example, in one specific alternative embodiment, the temperature of the outside air injected in the exchanger 3' by the air compressor 120 was above 15° C., and for example approximately 32° C., and the relative humidity level of this air was for example approximately 40%. The temperature of the liquid in the enclosure 10 was kept at approximately 15° C. The temperature of the air leaving each device 1 was thus approximately 15° C. The temperature of the site 2 was kept around 22° C. In reference to FIG. 7, the device 1 according to the invention may also be used in a facility making it possible to control and automatically maintain the relative humidity in a site 2 or the like. The entering stream of air F is captured by the device 1 outside the site 2, passes in the device 1, so as to be humidified or dehumidified depending on the case, and the humidified or dehumidified exiting stream of air F' is injected in the site 2, optionally after having been mixed with the ambient air A captured in the site 2 (FIG. 7/stream of air F").

The relative humidity HR in the site is measured using at least one humidity sensor 6 of the hygrostat type, which is positioned in the site outside the incoming stream of air F' or F". The device 1 is equipped with means 11 for controlling the temperature of the volume of liquid V in the device 1, which make it possible to automatically adjust the temperature of the volume of liquid V contained in the device 1 as a function of the relative humidity (HR) measured by the humidity sensor 6 in the site 2 and a humidity setpoint ($HR_{cons}$). The stream of air F' leaving the device 1 is injected in the site 2, optionally while being mixed with air A coming from inside the site 2.

The means for controlling the temperature of the volume of liquid V are designed such that the temperature of the volume of liquid V is automatically brought to a value above the temperature of the stream of air F entering the device 1, when the relative humidity HR measured by the sensor 6 is below the humidity setpoint ($HR_{cons}$); a more humid stream of air F' is thus produced, the absolute humidity of which (water weight per volume of air) is higher than the absolute humidity of the stream of air F entering the device 1, and the temperature of which is approximately at the temperature of the volume of liquid V and is higher than the temperature of the stream of air F entering the device 1. The entering stream of air F' thus makes it possible to humidify the site 2.

The means for controlling the temperature of the volume of liquid V are further designed such that the temperature of the volume of liquid V is automatically brought to a value below the temperature of the stream of air F entering the device 1, when the relative humidity HR measured by the sensor 6 is above the humidity setpoint ($HR_{cons}$); a less humid stream of air F' is thus produced, the absolute humidity of which (water weight per volume of air) is lower than the absolute humidity of the stream of air F entering the device 1, and the temperature of which is approximately at the temperature of the volume of liquid V and is lower than the temperature of the stream of air F entering the device 1.

Alternatively, it is also possible for the entering stream of air F to be completely or partially captured by the device 1 inside the site 2.

Alternatively, it is also possible to heat or cool, using any heating or cooling means, the stream of air (F' or F") entering the site 2 without modifying its absolute humidity so as to bring it to a predefined temperature.

It is also possible to replace the sensor 6 of FIG. 7 with a sensor 6 positioned in the stream of air (F' or F") entering the site 2 and measuring the absolute humidity of said stream of air. In this case, a stream of air (F' or F") is injected in the site 2 whereof the absolute humidity is automatically controlled relative to a humidity setpoint by automatically adjusting the temperature of the volume of liquid contained in the device 1.

The invention claimed is:

1. A device for producing a stream of air comprising a unitary enclosure, adapted to contain a volume of liquid, and which includes at least one air discharge opening and an air injection means including a vertical tube which is positioned inside the enclosure and whose lower vertical part is submerged in said volume of liquid contained in the enclosure and comprises an air outlet submerged in said volume of liquid contained in the enclosure at a depth comprised between 20 mm and 80 mm, wherein said air injection means are adapted to create and pass an incoming stream of air with a flow rate of at least 100 m³/h, from the outside of the enclosure in said volume of liquid, by injecting said incoming stream of air into said volume of liquid, below the surface of said volume of liquid, such that said incoming stream of air creates turbulence in said volume of liquid that causes spraying of liquid drops and that said incoming stream of air is treated by direct contact with the volume of liquid and leaves the volume of liquid in the form of an outgoing stream of air which is discharged outside said enclosure by passing through the air discharge opening of the enclosure, wherein the enclosure includes one or several baffles that are positioned above the volume of liquid and between the volume of liquid and said discharge opening, said one or several baffles being positioned horizontal with respect to the top of surface of the volume of liquid along the plates major surface or wherein the enclosure includes several baffles that are positioned above the volume of liquid and between the volume of liquid and said discharge opening with at least one baffle above another baffle, said one or several baffles enabling to circulate the outgoing stream of air leaving the volume of liquid to the discharge opening, causing the outgoing stream of air to undergo one or several changes of direction, so as to prevent the spraying of liquid through the air discharge opening.

2. The device according to claim 1, wherein each baffle is a plate that is fastened inside the enclosure while being in tight contact over each baffle's entire periphery with the enclosure, and that includes at least one through opening for the passage of stream of air exiting through the plate.

3. The device according to claim 2, including several baffles whereof the through openings are not aligned with the air discharge opening of the enclosure.

4. The device according to claim 1, wherein the enclosure includes an upper wall, a bottom wall and a side wall connecting the upper wall and the bottom wall, and in which the intake opening and the discharge opening are made in the upper wall of the enclosure.

5. The device according to claim 1, including temperature control means configured to keep the temperature of said volume of liquid in the enclosure at a predefined temperature or to renew the liquid in the enclosure, so as to automatically keep, in the enclosure, a predefined volume of liquid at a predefined temperature.

6. The device according to claim 1, wherein each baffle includes a through opening for the passage of the tube, and the tube is passed through said through opening of each baffle, while being in tight contact over the tube's entire outer periphery with the baffle at each through opening.

7. The device according to claim 1, wherein the air injection means include an air compressor, which is outside the enclosure, and the outlet of which can be connected or is connected to the air intake opening of the enclosure or the intake of which can be connected or is connected to the air discharge opening of the enclosure.

8. The device according to claim 7, wherein the air compressor allows heating of the air passing through the air compressor with a temperature gradient $\Delta T$ of at least 2° C.

9. A method for producing a stream of air using the device set out in claim 1, wherein the enclosure of the device contains a volume of liquid, wherein an incoming stream of air from the outside of the enclosure is injected into said volume of liquid, with a flow rate of at least 100 m$^3$/h below the surface of said volume of liquid, such as to create turbulence in the volume of liquid that may cause spraying of liquid drops, wherein said incoming stream of air is treated by direct contact with the volume of liquid and leaves the volume of liquid in the form of an outgoing stream of air, wherein the outgoing stream of air is discharged outside said enclosure by passing through an air discharge opening of the enclosure, and wherein before being discharged outside said enclosure the outgoing stream of air is circulated by one or several baffles that are positioned above the volume of liquid, between the volume of liquid and said discharge opening, said one or several baffles being positioned horizontal with respect to the top of surface of the volume of liquid along the plates major surface or wherein the enclosure includes several baffles that are positioned above the volume of liquid and between the volume of liquid and said discharge opening with at least one baffle above another baffle, said one or several baffles enabling to circulate the outgoing stream of air leaving the volume of liquid to said discharge opening, and causing the outgoing stream of air to undergo one or several changes of direction, so as to prevent the spraying of liquid through said air discharge opening.

10. The method according to claim 9, wherein the height of the volume of liquid is below 200 mm.

11. The method according to claim 9, wherein the temperature of the volume of liquid is automatically controlled and kept at a predefined temperature, or wherein the liquid in the enclosure is renewed, so as to automatically keep, in the enclosure, a predefined volume of liquid at a predefined temperature.

12. The method according to claim 9, wherein the ratio between the air flow rate entering the enclosure and the volume of liquid contained in the enclosure is greater than $10^4 h^{-1}$.

13. The method according to claim 9, wherein the stream of air coming from outside the enclosure and entering the enclosure includes particles and/or pollutants, and at least part of these particles and/or pollutants are captured in the liquid contained in the enclosure.

14. A facility allowing the heating and/or cooling and/or humidification and/or dehumidification of a site, and including at least one device as set out in claim 1, and which is arranged such that the air that is injected in the enclosure of the device is coming from outside the site.

15. The facility according to claim 14, for heating or humidifying a site, further including a heat exchanger connected to the enclosure of the device, such that the heated air coming from the enclosure crosses through said heat exchanger, before being injected inside the site, and air recycling means configured to supply the heat exchanger with recycled air coming from inside the site, such that the air coming from the device and crossing through a heat exchanger is heated by said recycled air coming from inside the site.

16. The facility according to claim 15, further including an air heating device positioned between the heat exchanger and the inside of the site, so as to preheat the air coming from the device and crossing through the heat exchanger before the air is introduced in the site.

17. The facility according to claim 14, for cooling or dehumidifying a site, further including a heat exchanger connected to the enclosure of the device, and air recycling means configured to supply the heat exchanger with recycled air coming from inside the site, such that the air injected in the enclosure of the device is previously cooled, by passing through the heat exchanger, by said recycled air coming from inside the site.

18. The method of claim 9 wherein the outgoing stream of air is used to heat a site or to cool a site, or to humidify a site or to dehumidify a site.

19. The method according to claim 18, wherein the site is a greenhouse.

20. A device for producing a stream of air comprising a unitary enclosure, adapted to contain a volume of liquid, and which includes at least one air discharge opening, air injection means including a vertical tube which is positioned inside the enclosure and whose lower vertical part is submerged in said volume of liquid contained in the enclosure and comprises an air outlet submerged in said volume of liquid contained in the enclosure at a depth comprised between 20 mm and 80 mm, wherein said air injection means are adapted to create and pass an incoming stream of air with a flow rate of at least 100 m$^3$/h, from the outside of the enclosure in a volume of liquid contained in the enclosure, by injecting said incoming stream of air into said volume of liquid, below the surface of said volume of liquid, such that said incoming stream of air creates turbulence in the volume of liquid that causes spraying of liquid drops and that said incoming stream of air is treated by direct contact with the volume of liquid and leaves the volume of liquid in the form of an outgoing stream of air which is discharged outside said enclosure by passing through the air discharge opening of the enclosure, wherein the enclosure includes one or several baffles that are positioned above the volume of liquid and between the volume of liquid and said discharge opening, said one or several baffles being positioned horizontal with respect to the top of surface of the volume of liquid along the plates major surface or wherein the enclosure includes several baffles that are positioned above the volume of liquid and between the volume of liquid and said discharge opening with at least one baffle above another baffle, said one or several baffles enabling to circulate the outgoing stream of air leaving the volume of liquid to the discharge opening causing the outgoing stream of air to undergo one or several changes of direction, so as to prevent the spraying of liquid through the air discharge opening, and said device further including a temperature control that automatically keeps the temperature of said volume of liquid in the enclosure at a predefined temperature, or renews the liquid in the enclosure, so as to automatically keep, in the enclosure, a predefined volume of liquid at a predefined temperature.

* * * * *